Jan. 2, 1934.   G. A. GRASSBY, JR   1,941,891
CONVEYER SYSTEM
Filed Dec. 24, 1930   2 Sheets-Sheet 1

Inventor
George A. Grassby, Jr.
by Roberts, Cushman & Woodbury,
Attys.

Jan. 2, 1934.  G. A. GRASSBY, JR  1,941,891
CONVEYER SYSTEM
Filed Dec. 24, 1930  2 Sheets-Sheet 2
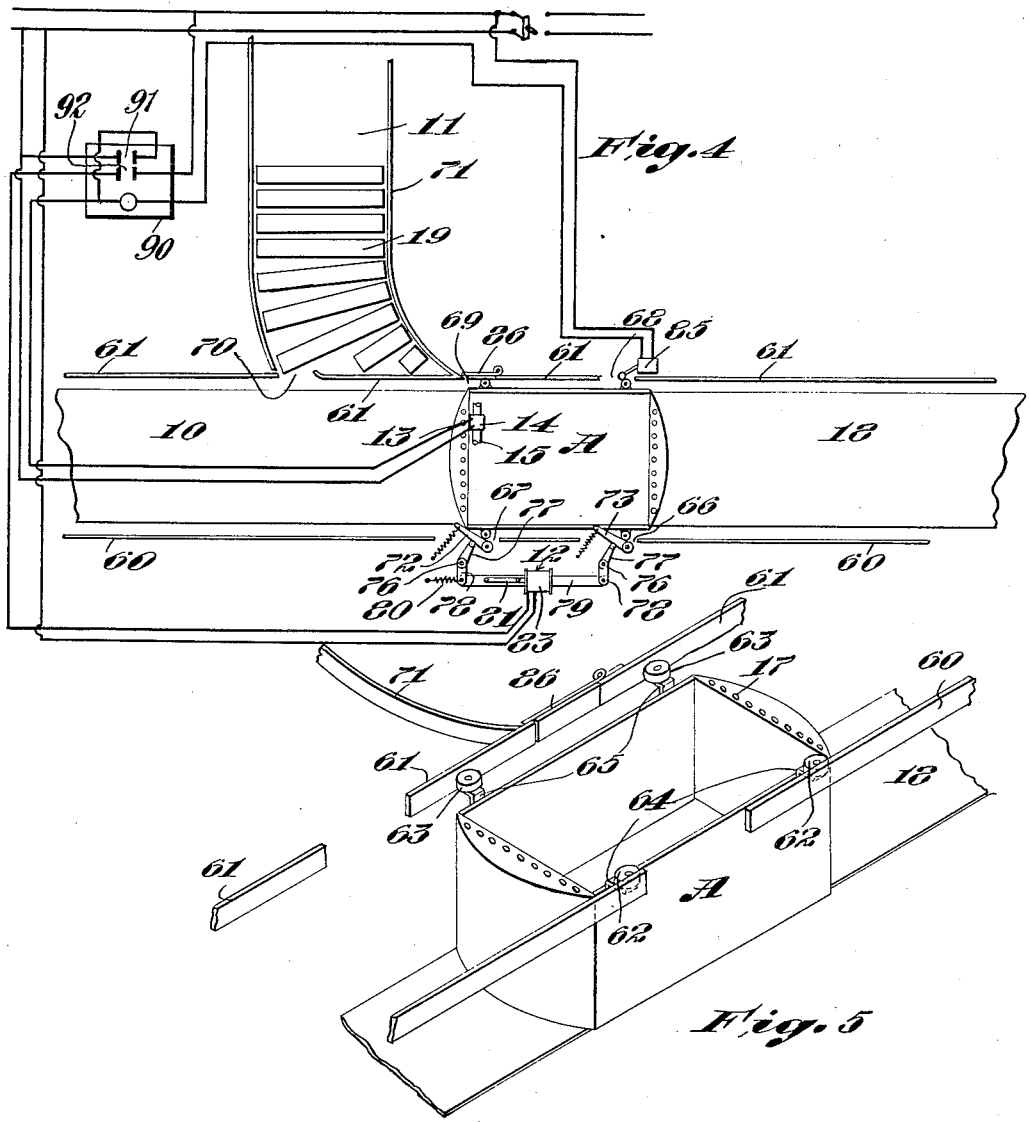
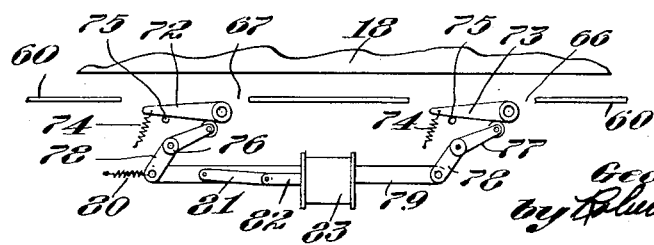

Patented Jan. 2, 1934

1,941,891

UNITED STATES PATENT OFFICE 1,941,891

CONVEYER SYSTEM

George A. Grassby, Jr., Newton Center, Mass., assignor to The Lamson Company, Syracuse, N. Y., a corporation of Massachusetts Application December 24, 1930
Serial No. 504,456

7 Claims. (Cl. 198—38)

This invention relates to an improvement in a conveyer system and more particularly in a system of the type which includes a plurality of conveyers and stations thereon and deflector mechanism by which articles traveling along the conveyers may be deflected therefrom at the various stations onto other conveyers, platforms, receptacles or elsewhere. The present invention resides in the deflector mechanism provided at the stations, two embodiments having been selected and described herein.

The primary object of this invention is to provide in the system, deflector mechanism comprising movable means whereby an article traveling along one conveyer is deflected to a second conveyer and stationary means by which the article is positively caused to travel along the second conveyer. A further object of this invention is to provide deflector mechanism comprising movable means which are caused to engage positively one side of an article traveling along a conveyer and to shift the article laterally of that conveyer, and independent stationary means for positively engaging the other side of the article and causing it to travel along a second conveyer.

Other objects of the invention reside in the various details of construction hereinafter disclosed and illustrated in the accompanying drawings, in which Fig. 1 is a plan view of a typical station of a conveyer system including one embodiment of this invention;

Fig. 4 is a plan view of a typical station of a conveyer system including another embodiment of this invention;

Fig. 5 is a perspective view of such station showing an article traveling upon one conveyer past a second conveyer; and Fig. 6 is a plan view of the movable means of deflector mechanism at that station with the parts in the inoperative position.

Figure 1:
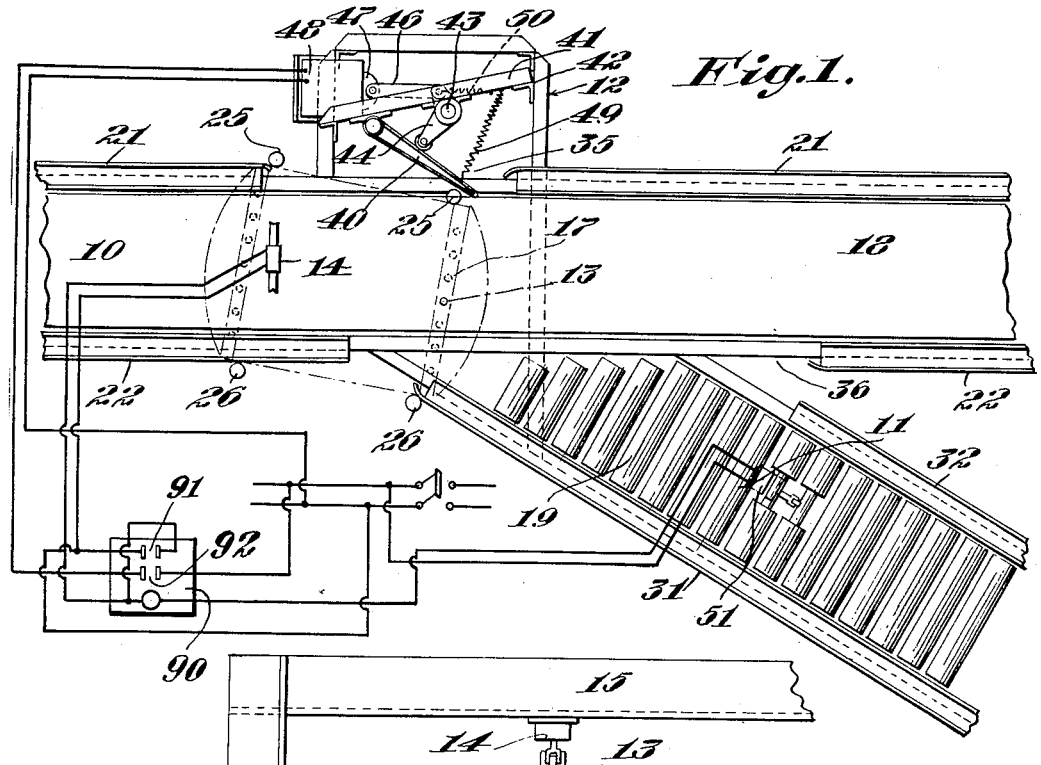

Both of the embodiments selected to illustrate the invention have features in common which will now be described, the same reference characters being employed throughout the drawings. The article, here illustrated as a car A, is normally transported along a conveyer 10, which will hereinafter be referred to as the main conveyer, from which conveyer the articles may be deflected to a second or branch conveyer 11 by the operation of the mechanism designated generally as 12. Such mechanism in each embodiment comprises a movable means, herein nominated as a switch and a fixed or stationary means. The switch of each deflecting mechanism 12 preferably is electrically operated by the engagement of a pin 13 carried by the car A with a circuit control device 14 suitably supported on a crossbar 15 extending across the conveyer 10. The cars are provided at their front and rear ends with a plurality of transversely extending holes 17 each of which is adapted to receive the pin 13. In accordance with the well known practice, the circuit control device 14 of each station is located at a predetermined position transversely of the conveyer, and each car having a pin 13 in the hole 17 at the forward end thereof corresponding to the position of the circuit control device at a predetermined station is deflected by the mechanism 12 from the main conveyer 10 to the conveyer 11 at that station. Obviously a car carrying a pin 13 in any other of the holes 17 would not be deflected onto the branch conveyer 11 but would continue along the main conveyer 10 through the station until it arrives at a station the circuit control device of which is located in the position to be contacted by the pin on the car.

For the purpose of illustrating this invention the conveyer 10 is shown as of the endless belt type including a belt 18 and the conveyer 11 is shown as of the gravity roller type having a plurality of load-carrying rollers 19. It will be understood however that I am not limited thereby and that other forms of conveyers may be employed if desired or that for the conveyer 11 may be substituted a platform or other article receiving means.

Figure 2:
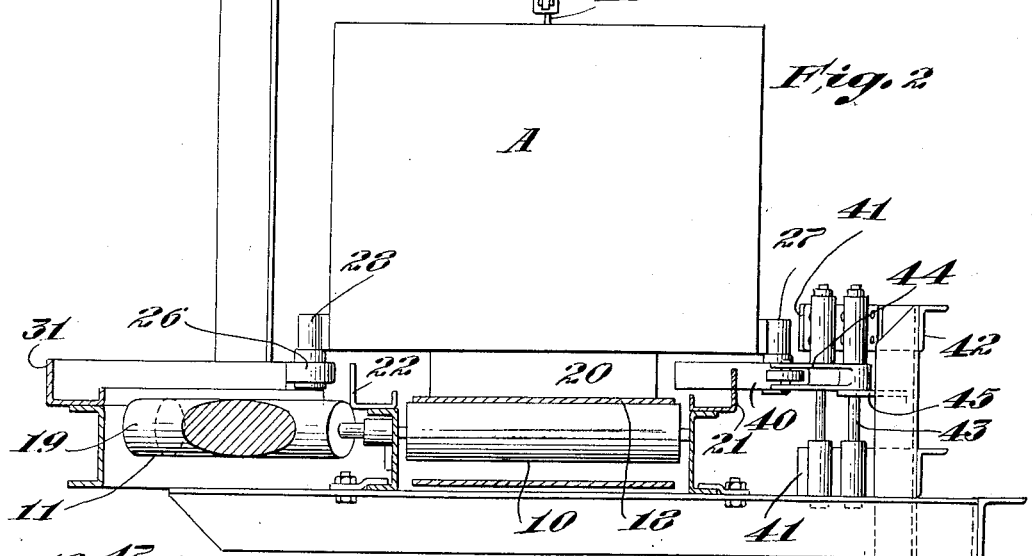
Fig. 2 is an enlarged cross section of such station showing in elevation an article about to be deflected thereat.
Figure 3:
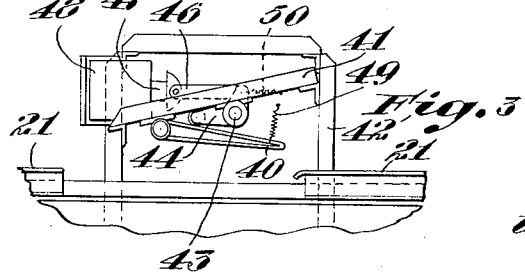
Fig. 3 is a plan view of the movable means of the deflector mechanism at such station in its inoperative position.

In the embodiment shown in Figs. 1, 2 and 3 the car A is provided with a block 20 which rests upon the belt 18 of the conveyer 10 so that the main portion of the car is supported above a pair of rails 21, 22 which extend at either side of the conveyer belt. At the front and rear of each side of the car are outwardly and downwardly projecting elements comprising rollers 25, 26 supported by brackets 27, 28 which extend beyond the side rails 21, 22 preferably out of contact therewith, as shown, for example, in Fig. 2. It will be understood that any tendency of the car to shift from its normal position will be quickly counteracted by the contact of the rollers with one of the side rails 21, 22 without appreciable loss of headway.

Extending along at each end of the rolls 19 of the conveyer 11 are side rails 31, 32 which function like the side rails 21, 22 of the main conveyer to ensure the proper location of the cars on the conveyer and which have a further function to be described hereinbelow. The side rails 21, 22 as shown particularly in Fig. 1, are interrupted at the junction of the conveyers 10 and 11. The space 35 between the sections of rail 21 permits the operation of the switch of the deflector mechanism about to be described and the space 36, between sections of the rail 22 provides an opening through which the cars are deflected onto the branch conveyer 11.

The switch of the deflector mechanism shown in this embodiment comprises a single switch arm 40 pivotally supported upon parallel crossbars 41 fixed in a frame 42 at one side of the conveyer. Secured upon a vertical rotatable shaft 43 mounted in journals on the crossbars 41 is an arm 44 which contacts with the switch arm 40, as shown in Fig. 1. A second arm 45 carried by the shaft 43 is connected by a link 46 to the piston 47 of a solenoid 48. A spring 49 secured at one end to the switch arm 40 and at the other end to a bar 41 tends to hold the switch arm and a similar spring 50 secured to the arm 45 tends to hold the piston 47 so that the parts normally assume the position illustrated in Fig. 3 with the switch in the inoperative position.

When a car destined to be deflected onto the branch conveyer 11 approaches the deflector mechanism 12, the pin 13 on the car contacts with the circuit control device 14, thus in the usual manner, not here shown, energizing the solenoid 48 whereupon the piston 47 is retracted, acting through the link 46, and the arm 45 to cause the shaft 43 to rotate in a counterclockwise direction. The arm 44 is thus caused to swing in the same direction and, bearing upon the switch arm 40, positively forces it into the position shown in Fig. 1, the tip of the arm passing through the opening 35 over the conveyer belt. The switch arm 40 in that position engages the forward roller 25 of the car and guides it laterally across the belt 18 without stopping its travel along the conveyer 10. The arm 44 is substantially perpendicular to the switch arm 40 so that the impact of the car is directly transmitted to the shaft 43 and resisted thereby.

The car, as it is still advanced by the belt of the conveyer 10 is thus deflected by the arm 40 and the forward roller 26 on the other side of the car engages the outer face of the side rail 31 of the conveyer 11 so that as the car is advanced by the belt 18 it will be further deflected onto the conveyer 11 being positively drawn thereon by the coaction of the roller 26 and the rail 31. The switch arm 40 retains the position shown in Fig. 1 and contacts with the rear roller 25 shifting the rear end of the car laterally of the belt 18 so that the rear roller 26 will in turn contact with the outer face of the rail 31 and the car is thus prevented from traveling beyond the station on the conveyer 10 and passes onto the conveyer 11. After traveling a predetermined distance over the conveyer 11 the car contacts with a circuit control device 51 by which the circuit energizing the solenoid 48 is broken and the arm 45, by the action of the spring 50, rotates the shaft 43 in the clockwise direction while the spring 49 draws the switch arm 40 back through the opening 35 out of the path of travel of the cars A.

The embodiment shown in Figs. 4, 5 and 6 is similar in many respects to that previously described. However, the car A of this embodiment is provided with elements which project outwardly and upwardly from the car and which engage side rails 60, 61 suitably located above the level of the belt 18 of the main conveyer 10. The elements are similar to those of the other embodiments and include rollers 62, 63 supported by brackets 64, 65. The side rail 60 of the conveyer 10 is interrupted to provide openings 66, 67 to accommodate the switch of the deflector mechanism 12 of this embodiment. The side rail 61 is also interrupted to provide openings 68, 69 and 70 for a purpose to be described later. Suitably supported at one side of the branch conveyer 11 is a rail 71 at the same height as the rail 61 of the conveyer 10 and here shown as joined to one section thereof.

The switch of the deflector mechanism 12 of this embodiment comprises a pair of pivotally supported switch arms 72, 73 normally held by springs 74 against stop pins 75 in the retracted position illustrated in Fig. 6. Pivotally mounted adjacent each of the switch arms 72, 73 is a bell crank lever 76 comprising an arm 77 which contacts with the adjacent switch arm and an arm 78. The arms 78 of the levers 76 are pivotally secured to the ends of a strap 79 adapted to reciprocate longitudinally and normally held by a spring 80 in the position shown in Fig. 6. Connected to the strap 79 by a link 81 is a piston 82 of a solenoid 83. It will be understood that these parts are suitably supported in a frame in any well known manner, such frame being omitted as not essential to a full disclosure of the invention.

When the circuit control device 14 at this station is tripped by a pin 13, suitably located upon a car, the solenoid 83 is energized, retracting the piston 82 and causing the strap 79 to travel to the right from the position shown in Fig. 6 to that shown in Fig. 4. This movement of the strap obviously causes the arms 77 of the lever 76 to move in a counterclockwise direction and advance the switch arms 72, 73 through the openings 66 and 67 in the side rail 60 into contact with the rollers 62 on the car A. The contact of the switch arms with the rollers 62 causes the car to be shifted laterally as a unit across the belt 18 so that the rollers 63 will pass through the openings 68 and 69 in the side rail 61. The arms 77 are substantially perpendicular to the switch arms 72, 73 so that they reinforce the switch arms and prevent any yielding thereof under impact of the cars. The car of course continues to be advanced by the belt 18 of the conveyer 10, and the forward roller 63 engages the rail 71, the roller 63 and rail 71 thereupon coacting, and thus positively drawing the forward end of the car onto the branch conveyer 11. The rear roller 63 bears against the outer face of the section of the side rail 61 between the openings 68 and 69 so that the rear end of the car can not return to its former position on the belt 18 of the conveyer 10.

As the rear roller passes through the opening 68, it trips a circuit breaker 85, opening the circuit by which the solenoid 83 was energized so that the switch part of the deflector mechanism under the action of the springs 74 and 80 returns to the normal position shown in Fig. 6. The opening 69 normally is closed by a gate 86 which, however, yields under the impact of the forward roller 63 when the car is shifted laterally by the switch arms 72, 73. The gate 86 closes as soon as the forward roller 63 has passed therethrough and acts as a guide for the rear roller 63, thus preventing any tendency of that roller to pass through the opening 69 and forcing it to continue into contact with the rail 71. The rollers 62 pass through the opening 70 as the car is deflected.

It will be noted that in both these embodiments the deflector mechanism acts upon the car similarly to shift it laterally across the conveyer. The switch of the deflector mechanism may include, as in the first embodiment, a single switch arm 40 engaging the rollers 25 successively, or, as in the second embodiment, two switch arms 72, 73 engaging the rollers 62 simultaneously. The car is swung onto the branch conveyer by the engagement of the rollers on one side (26 or 63) with a side rail (31 or 71) of that conveyer by which rail the car is drawn off the main conveyer and with which rail it would not have engaged unless the switch had previously acted upon the car. It will further be noted that the switch arms of both embodiments are advanced and retracted through openings in the side walls, are held rigidly in the deflecting position by arms which reinforce the switch arms and prevent any yielding under the impact of the cars and are normally out of the path of travel of the cars over the main conveyer, the position of the switch arms being determined by the cars on the conveyers.

Applied to Figs. 1 and 4 are showings of typical wiring diagrams by which the operations above described may be carried out. Included in each diagram is a relay 90 which is energized by the tripping of the circuit control device 14 by the approaching car and remains energized until a circuit control device (51 in Fig. 1 and 85 in Fig. 4) is tripped by the deflected car. Each relay 90 includes two normally open switches 91 and 92 which are closed in the well known manner when the relay is energized. The switch 91 completes a holding circuit which is maintained until the circuit control device 51 or 85 here shown as a normally closed circuit breaker is tripped and the switch 92 completes a circuit through which the switch operating solenoid (48 in Fig. 1 and 83 in Fig. 4) is energized to move the switching means into operative position. Detailed descriptions of the various circuits set up are thought to be unnecessary and have been omitted.

While certain embodiments of this invention have been shown and described and the details of construction thereof particularly set forth it will be understood that other embodiments and changes in the details may be made without departing from the spirit and scope of the invention as set forth in the following claims.

I claim:

1. In a conveyer system including a main conveyer over which cars are transported and a branch conveyer to which such cars may be deflected, rails at the sides of said main conveyer, elements projecting from the cars adjacent such rails and adapted to coact therewith to position the cars on the conveyer, a movable switch normally out of the path of travel of the cars, said switch when out of its normal position engaging the elements on one side of the car for shifting the car across the main conveyer, and a side rail adjacent the branch conveyer against the outer face of which rail the elements on the other side of the car bear whereby the car is positively deflected off the main conveyer.

2. In a conveyer system including a main conveyer over which cars are transported and a branch conveyer to which cars may be deflected from the main conveyer, deflector mechanism including a switch arm and a rail adjacent the branch conveyer, side rails adjacent the main conveyer and having openings therein, outwardly and downwardly projecting elements carried by the cars at each side thereof, and engaging the outer faces of the said rails to determine the position of the car on the main conveyer, said switch arm being normally behind an opening in one side rail, means for moving said switch arm through such opening into the path of travel of the car, whereupon it is contacted by the elements at one side of the car and the car is thereby shifted laterally across the conveyer as it continues its travel so that as the car is transported along the main conveyer the elements on one side of the car pass through said opening and the elements on the other side of the car pass through the opening in the other side rail and engage the outer surface of the rail adjacent the branch conveyer whereby the car travels through an opening in the other side rail onto the branch conveyer.

3. In a conveyer system including a main conveyer over which cars are transported and a branch conveyer to which cars may be deflected from the main conveyer, deflector mechanism including a switch arm and a rail adjacent the branch conveyer, side rails adjacent the main conveyer and having openings therein, outwardly and downwardly projecting elements carried by the cars at the forward and rear ends of each side, and engaging the outer faces of the said rails to determine the position of the car on the main conveyer, said switch arm being normally behind an opening in one side rail, means for moving said switch arm through such opening into the path of travel of the car, whereupon it is contacted successively by the forward and rear elements at one side of the car and the car is thereby shifted laterally across the conveyer as it continues its travel so that as the car is transported along the main conveyer the forward and rear elements on one side of the car pass through such opening and the forward and rear elements on the other side of the car successively pass through the opening in the other side rail and engage the outer surface of the rail adjacent the branch conveyer whereby the car travels through the opening in the other side rail onto the branch conveyer.

4. In a conveyer system including a main conveyer over which cars are transported and a branch conveyer to which cars may be deflected from the main conveyer, deflector mechanism comprising a plurality of switch arms and a rail adjacent the branch conveyer, side rails at each side of the main conveyer and having longitudinally spaced openings therein, outwardly and upwardly projecting elements at the forward and rear end of each side of the car, said elements extending between the side rails, means for moving the switch arms through the longitudinally spaced openings in one side rail into and out of the path of travel of the elements on one side of the car whereby the car is shifted laterally across the conveyer and the elements on the other side of the car pass through openings in the other side rail and, as the car continues its travel along the main conveyer, contact with the branch conveyer rail whereby the car is deflected onto the branch conveyer.

5. In a conveyer system including a main conveyer over which cars are transported and a branch conveyer to which cars may be deflected from the main conveyer, deflector mechanism comprising a plurality of switch arms and a rail adjacent the branch conveyer, side rails at each side of the main conveyer and having longitudinally spaced openings therein, outwardly and upwardly projecting elements at the forward and rear end of each side of the car, said elements extending between the side rails, means for moving the switch arms through the longitudinally spaced openings in one side rail into and out of the path of travel of the elements on one side of the car whereby the car is shifted laterally across the conveyer and the elements on the other side of the car pass through openings in the other side rail, and, as the car continues its travel along the conveyer, contact with the branch conveyer rail for deflecting the car onto that conveyer, the movement of said switch arms into the path being controlled by the approaching car and the movement thereof out of the path being controlled by that car as it is shifted and the elements thereon pass through the openings in the side rail.

6. In a conveyer system including a main conveyer over which cars are transported and a branch conveyer to which cars may be deflected from the main conveyer, deflector mechanism comprising a plurality of switch arms and a rail adjacent the branch conveyer, side rails at each side of the main conveyer and having longitudinally spaced openings therein, outwardly and upwardly projecting elements at the forward and rear end of each side of the car, said elements extending between the side rails, means for moving the switch arms through the longitudinally spaced openings in one side rail into and out of the path of travel of the elements on one side of the car whereby the car is shifted laterally across the conveyer and the elements on the other side of the car pass through openings in the other side rail, and, as the car continues its travel along the conveyer, contact with the branch conveyer rail for deflecting the car onto that conveyer, the movement of said switch arms into the path being controlled by the approaching car, and means controlled by the car on its lateral movement for permitting the movement of the switch arms out of the path.

7. In a conveyer system including a main conveyer over which cars are transported and a branch conveyer to which certain of such cars may be deflected, rails at the side of said main conveyer, elements projecting from the sides of said cars and adapted to coact with said rails to position the cars on the conveyer, a movable switch normally out of the path of travel of the cars, means controlled by the cars to be deflected to move said switch into a position in which it engages certain of said elements and thereby shifts such cars laterally across the main conveyer, and a side rail adjacent the branch conveyer, with the outer face of which rail, other of said elements are brought into contact by the shifting of such cars.

GEORGE A. GRASSBY, Jr.